(No Model.)
G. F. WAGNER.
SOD CUTTER.
No. 485,441. Patented Nov. 1, 1892.
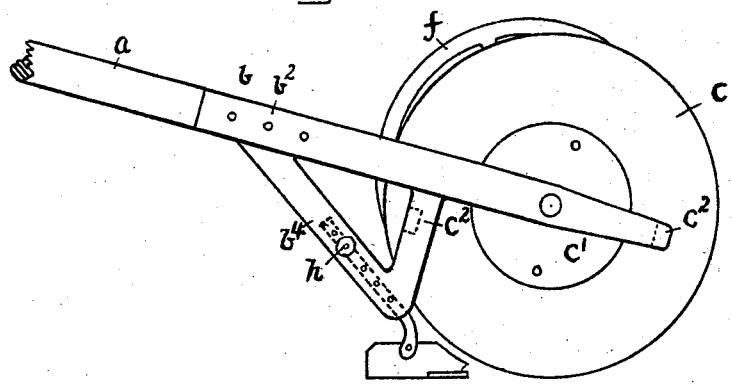
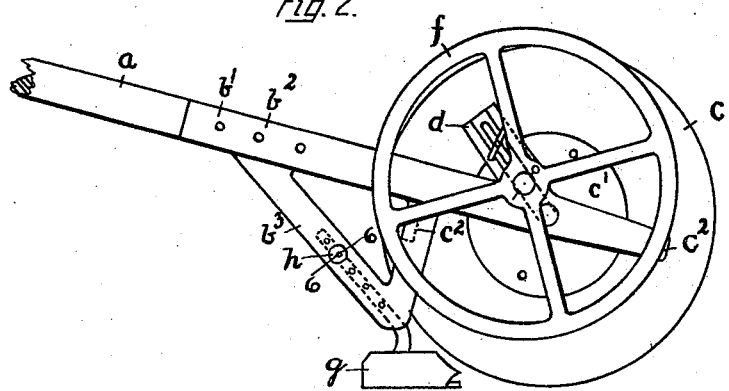
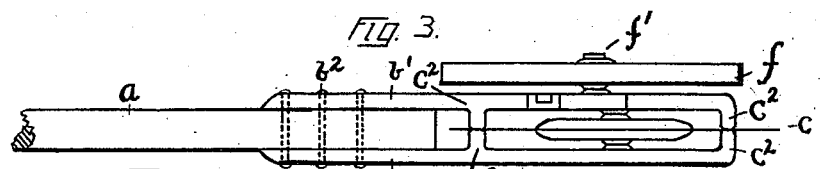
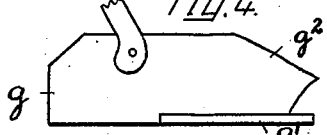
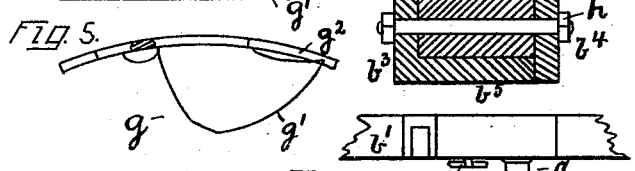
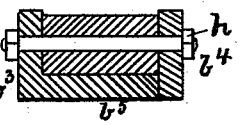
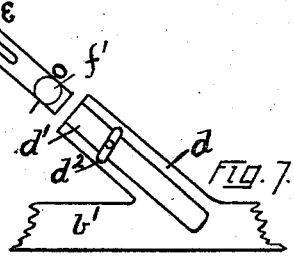
Witnesses
Thomas M. Smith
John W. Achard
Inventor
George F. Wagner
by
Augustus B. Stoughton
Attorney

UNITED STATES PATENT OFFICE.

GEORGE F. WAGNER, OF PHILADELPHIA, PENNSYLVANIA.

SOD-CUTTER.

SPECIFICATION forming part of Letters Patent No. 485,441, dated November 1, 1892.

Application filed July 26, 1892. Serial No. 441,328. (No model.)

*To all whom it may concern:*

Be it known that I, GEORGE F. WAGNER, a citizen of the United States, residing at the city of Philadelphia, in the county of Philadelphia and State of Pennsylvania, have invented certain new and useful Improvements in Sod-Cutters, of which the following is a specification.

My present invention relates to the class of sod-cutters which are adapted to be propelled by hand and used by landscape-gardeners and others.

The principal objects of my present invention are, first, to provide a simple, compact, convenient, and efficient implement for trimming the edges of garden-paths, flower-beds, roads, and the like, and for cutting up turf into sods, and, second, to construct and arrange the parts of the implement in such manner that the same may be adjusted to accommodate persons of different sizes and to increase and diminish the depth of the cut.

My invention consists in the improvements in sod-cutters hereinafter described and claimed.

The nature, scope, and objects of my invention will be more fully understood from the following description, taken in connection with the accompanying drawings, forming part hereof, and in which—

Figures 1 and 2 are side elevational views of a sod-cutter embodying features of my invention. Fig. 3 is a top or plan view of Fig. 1. Figs. 4 and 5 are respectively a detached elevation and a plan of the deliverer for loosening the slice that has previously been cut in a vertical direction by the disk cutter. Fig. 6 is a section taken on the line 6 6 of Fig. 2, and drawn to an enlarged scale. Figs. 7 and 8 are respectively a detached elevation and a plan of the stud for carrying the gage-wheel and its accessories.

In the drawings, $a$ is the handle by which the machine or implement is propelled. $b$ and $b'$ are plates secured to place upon opposite sides of the handle $a$ by means of bolts or rivets $b^2$ and provided with depending brackets $b^3$ and $b^4$ for a purpose to be presently described. $c$ is a disk cutter journaled intermediate of the plates $b$ and $b'$ and provided with reinforce hubs or disks $c'$. These hubs or disks $c'$, together with lugs $c^2$, projecting from the plates $b$ and $b'$ and brackets $b^3$ and $b^4$, serve to impart rigidity to the cutter $c$, and to prevent undue aberration of the same. The plate $b'$ is provided with an upwardly-projecting arm $d$, having ways $d'$, cast or otherwise formed therein for the reception of a slotted traveler $e$, which is afforded a range of adjustment and may be clamped to place by means of a set-screw $d^2$. $f$ is a gage-wheel revolubly mounted upon an axis or stud $f'$, carried by the traveler $e$.

Referring now more particularly to Fig. 6, one of the brackets—in the present instance the bracket $b^3$—is provided with a lateral extension $b^5$, which, together with the brackets themselves, constitute ways for the reception of the shank of a deliverer $g$. This deliverer comprises a horizontal blade $g'$ and a vertical blade $g^2$, constructed, preferably, of substantially the form illustrated in Figs. 4 and 5.

$h$ is a pin, bolt, or set-screw, in the present instance a bolt, adapted for insertion int suitable apertures in the brackets $b^3$ and $b^4$ and in the shank of the deliverer.

The mode of operation of the hereinabove-described sod-cutter may be described as follows: The gage-wheel $f$ rests upon the sod, and the disk cutter $c$ is caused to penetrate the same by reason of the power exerted upon the handle $a$ by the operator, who for this purpose may grasp the handle at a point very near to the disk cutter, whereby the latter may be conveniently and easily propelled and accurately guided. It may be remarked that the disk cutter $c$ and gage-wheel $f$ are substantially concentric in respect to each other, so that the machine may be advantageously employed for cutting sharp curves, as is necessary in the formation of fancy flower-beds and in other well-understood gardening operations. The depth of the cut of the machine may be increased and diminished by adjusting the gage-wheel $f$ upward or downward, as may be required, by means of the traveler $e$ and a set-screw $d^2$. This is important, because turf differs widely in respect to its thickness. The horizontal blade $g'$ of the deliverer $g$ serves to loosen the strip of sod that has been previously severed from the turf by the disk cutter $c$, and the blade $g^2$ serves to push the loosened and severed strip of sod to one side of the machine into convenient position for removal. The bolt, pin, or set-screw, in the present instance the bolt *h*, affords means whereby the deliverer *g* may be adjusted in respect to the handle *a*. This result is important, because it affords means for adjusting the deliverer into proper position when the handle *a* is held at different inclinations, which of course depend upon the height of the operator—that is to say, the taller the operator the greater the inclination of the handle. The bolt *h* also affords means for detaching the deliverer *g* whenever it becomes necessary or desirable so to do—for example, when cutting turf into sods for subsequent transplanting.

Having thus described the nature and objects of my present invention, what I claim as new, and desire to secure by Letters Patent, is—

1. A sod-cutter comprising the combination of a main frame having a disk cutter journaled thereto, a gage-wheel afforded a range of radial adjustment in respect to the axis of the disk cutter, and means for clamping the gage-wheel to place, the construction being such that the gage-wheel is substantially concentric in respect to the axis of the disk cutter, whereby the machine is permitted to operate on curves of short radius, as described.

2. A sod-cutter comprising a handle, plates secured to said handle, a disk cutter journaled to said plates, an arm on one of said plates, a gage-wheel, and means for adjustably connecting said wheel and arm, substantially as and for the purposes set forth.

3. A sod-cutter comprising a handle, plates secured to said handle and provided with depending brackets, a disk cutter journaled to said plates, an arm on one of said plates, a gage-wheel adjustably connected to said arm, and a deliverer adjustably connected with said brackets, substantially as and for the purposes set forth.

4. A sod-cutter comprising a handle, plates secured to said handle and provided with depending brackets, a disk cutter journaled to said plates, lugs for supporting the disk-cutter, an arm on one of said plates, a gage-wheel adjustably connected to said arm, and a deliverer pinned to said brackets, substantially as and for the purposes set forth.

In witness whereof I have hereunto signed my name in the presence of two witnesses.

GEORGE F. WAGNER.

Witnesses:
A. B. STOUGHTON,
HARRY J. WAGNER.